June 26, 1962  R. E. WARREN  3,040,598

VIBRATION DAMPER FOR A SHAFT

Filed Dec. 1, 1959

Inventor
ROBERT E. WARREN

By R. I. Tompkins
Attorney

3,040,598
VIBRATION DAMPER FOR A SHAFT
Robert E. Warren, Marblehead, Mass., assignor, by mesne assignments, to the United States of America as represented by the Secretary of the Navy
Filed Dec. 1, 1959, Ser. No. 856,627
9 Claims. (Cl. 74—574)

The present invention relates to a vibration damper for a shaft and more particularly to a vibration damper which provides a cushioning material which will dampen vibrations of a shaft when it is rotating at a critical speed.

Many rotating shafts due to their length and slenderness have particular speeds of rotation which cause vibration. These speeds are called critical speeds and can be very damaging to any bearings which support the shaft. The present invention dampens the shaft vibration due to critical speeds by providing a cushioning material in the proximity of the shaft between the shaft bearings so that when the shaft vibrates the cushioning material acts on the shaft to resist the vibratory oscillation.

Accordingly, an object of the present invention is to dampen the vibration of a rotating shaft with a cushioning material.

Another object of the invention is to cushion the vibration of a shaft rotating at critical speeds by providing a cushioning material around the periphery of the shaft so that the vibrations will be dampened.

Another object of the invention is to dampen the vibration of a shaft which is rotating inside and concentric with another shaft.

Another object of the invention is to rotate a column of liquid in an annular container adjacent to and around the periphery of a rotating shaft so that the liquid will be restrained in the container and provide a cushioning surface to dampen vibrations of the shaft.

Another object of the invention is to dampen the vibrations of a first shaft rotating inside and concentric with a second shaft by rotating an annular column of liquid in a container which is mounted on the interior surface of the second shaft so that the liquid is restrained in place and provides a cushion for vibrations of the shaft.

Another object of the invention is to provide a means for supplying a liquid to a container which container rotates around the periphery of a rotating shaft at such a speed as to restrain the liquid and to cause the liquid to be a cushion for vibrations of the shaft.

Another object is to cushion the vibration of a rotating shaft by providing a rotating column of fluid and by providing a means for replenishing this column of fluid.

A further object of this invention is to provide a vibration damper for a rotating shaft which does not require any connection with any structure exterior of the vibration damper between the bearings supporting the rotating shaft.

A further object is to provide a vibration damper for a rotating shaft which is more economical to operate than other such vibration dampers.

Other objects and many attendant advantages of this invention will be readily appreciated as the same becomes better understood by reference to the following detailed description when considered in connection with the accompanying drawing wherein.

Figure 1:
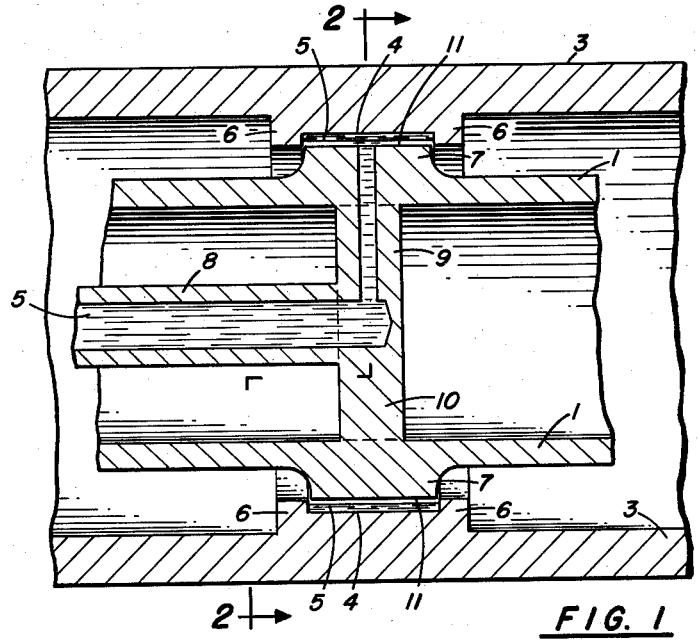
FIG. 1 shows a cross sectional side view of a preferred embodiment of the invention.
Figure 2:
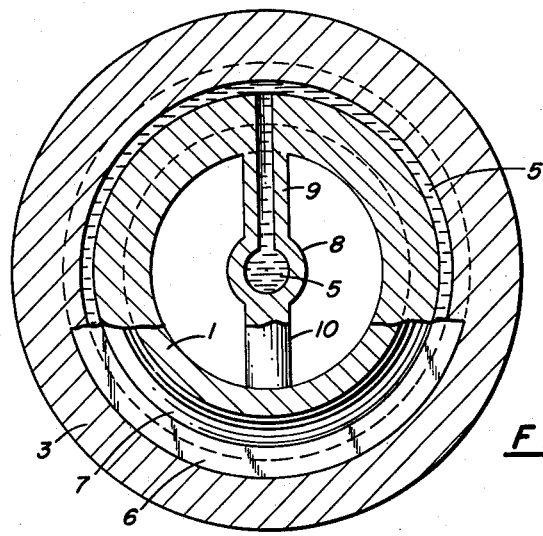
FIG. 2 shows an end view of the invention along different cross sections as set forth by the line 2—2 in FIG. 1.

Referring now to the drawings, wherein like reference characters designate like or corresponding parts throughout the several views numeral 1 designates a hollow rotating shaft, the vibration of which is to be dampened. Concentric with and circumscribing the periphery of shaft 1 is a second hollow shaft 3 which is designed to be under most circumstances more stiff than shaft 1. Shaft 3 has an annular container, dashpot or groove 4 located on its interior surface which is adapted to contain fluid 5. Annular lips 6 form a part of container 4 and are of such a depth, preferably ⅛", that the fluid upon rotation will provide a good cushioning material. An annular journal or land 7 having an annular surface 11 is provided on shaft 1 and is adapted to recess within container 4 upon vibration of shaft 1 without contacting lips 6. The length of surface 11 and the length of container 4 along the longitudinal axis of the shafts is to be designed for the proper amount of cushioning desired since a longer length will provide more cushioning than a shorter length. Oil 5 is to be supplied to container 4 through oil conduits 8 and 9. Oil conduit 8 is connected at one end to an oil source (not shown) and at the other end is integral with oil conduit 9. A rib 10 integral with conduits 8 and 9 is diametrically opposite conduit 9 and is of such size and weight to counterbalance the forces due to the rotation of conduit 9.

In the operation of the device it is preferable to commence rotation of shaft 3 before shaft 1 and at the same time direct oil through conduit 9 into container 4. When shaft 3 obtains the proper speed and container 4 contains the proper amount of oil the rotation of shaft 1 is commenced. When there is no lateral vibration in shaft 1 there will be no contact between surface 11 and the oil in container 4, however, whenever shaft 1 vibrates in a lateral direction surface 11 will contact the surface of the oil in container 4 thereby damping the vibration. The oil may be supplied to container 4 by a pressure at the oil source (not shown) as well as by the centrifugal action of conduit 9. The pressure of the oil at the oil source and the inside diameter of conduits 8 and 9 may be designed so that the supply of oil to container 4 is regulated.

The preferred embodiment as above described can be modified in many respects. A cushioning material such as rubber could be placed around the periphery of shaft 1 so that the lateral vibrations of the shaft are cushioned. In such a device shaft 1 need not be hollow and instead of using shaft 3 a holder means could be used to position the cushioning material. Further, in the preferred embodiment the material forming conduit 9 and rib 10 could be extended to form an annular disc shaped web extending from conduit 8 to surface 11 and having a plurality of openings so that oil is supplied to container 4 at various points around the periphery of surface 11. Also, an entirely different means of oil supply may be effected by forming an oil conduit in shaft 3 or mounting an oil conduit on shaft 3 so that it will supply oil into container 4. In this latter arrangement shaft 1 again need not be hollow. Further, any fluid could be used as the cushioning material in container 4, however, in the preferred embodiment an oil of substantially the same viscosity as that used for the bearings for shaft 1 would be employed. Also, in the preferred embodiment the container 4 need not have lips 6 but could just as well be an annular groove in shaft 3 so that there would be no projection from the interior surface of said shaft.

Obviously many modifications and variations of the present invention are possible in the light of the above teachings. It is therefore to be understood that within the scope of the appended claims, the invention may be practiced otherwise than as specifically described.

What is claimed is:
1. A vibration damper comprising a first rotating shaft, a second rotating shaft which is hollow and concentric with and stiffer than said first shaft, the interior surface of said second shaft circumscribing the exterior periphery of said first shaft, an annular groove operatively associated with said shafts, an annular journal operatively associated with said shafts and adapted to recess within said groove upon transverse vibration of said first shaft, a first hollow conduit extending lengthwise along the center of the first shaft, a second hollow conduit joining the first conduit and extending through the annular journal, and a cushioning material passing along the conduits to be disposed within said groove so that transverse vibrations of said first shaft are damped by contact of said journal with said cushioning material.

2. A vibration damper as claimed in claim 1 wherein said annular groove is mounted on the interior surface of said second shaft and said annular journal is mounted on the periphery of said first shaft.

3. A vibration damper as claimed in claim 2 wherein said cushioning material is a fluid.

4. A vibration damper comprising a first rotating shaft, a second rotating shaft which is hollow and concentric with and stiffer than said first shaft, the interior surface of said second shaft circumscribing the exterior periphery of said first shaft, an annular groove in the interior surface of the second shaft, an annular journal on the exterior surface of the first shaft adapted to recess within said groove upon transverse vibration of the first shaft, and a cushioning fluid disposed within said groove so that transverse vibrations of said first shaft are damped by contact of said journal with said cushioning material, said fluid being a liquid and said shaft rotating at a velocity sufficient to substantially retain said liquid within said groove and to make said fluid have practical cushioning properties.

5. A vibration damped as claimed in claim 4 including means to supply fluid to said groove.

6. A vibration damper as claimed in claim 5 wherein the means to supply fluid to said groove comprises an oil conduit connected at one end to an oil source, an oil passage through said journal providing a passageway between the interior surface of said first shaft and the exterior periphery of said journal and the other end of said oil conduit operatively engaging the interior opening of said passageway so that oil can be delivered to said groove.

7. A vibration damper as claimed in claim 6 wherein said oil conduit is integral with said first shaft.

8. A vibration damper comprising a first independently rotating shaft, a second independently rotating shaft at least partially circumscribing said first rotating shaft and being more stiff than said first shaft, at least one annular groove on said second shaft adjacent the first rotating shaft and adapted to contain a fluid, a land on said first rotating shaft adapted to mate within said groove, and a fluid disposed within said groove so that transverse vibrations of said first rotating shaft will be dampened by contact of said land with said fluid.

9. A vibration damper comprising a first rotating shaft, a second rotating shaft at least partially circumscribing the first shaft and being stiffer than the latter, an annular groove on said second shaft adjacent said first shaft and circumscribing the periphery thereof, an annular journal on said first shaft adapted to recess within the annular groove without contacting the sides of the groove, and a cushioning material disposed within said groove so that transverse vibrations of the first shaft will be dampened by contact of the journal with said cushioning material.

References Cited in the file of this patent

UNITED STATES PATENTS

| | | |
|---|---|---|
| 763,409 | Lind | June 28, 1904 |
| 1,983,548 | Knox et al. | Dec. 11, 1934 |
| 2,125,617 | Niemann | Aug. 2, 1938 |
| 2,379,508 | Dodge | July 3, 1945 |
| 2,532,795 | Underwood et al. | Dec. 5, 1950 |
| 2,775,317 | Sinisterra | Dec. 25, 1956 |
| 2,838,955 | Burch | June 17, 1958 |